United States Patent [19]

Reid

[11] Patent Number: 4,585,555

[45] Date of Patent: * Apr. 29, 1986

[54] BARRIER OXIDATION DITCH HAVING INCREASED FLOW EFFICIENCY AND OXYGEN TRANSFER EFFICIENCY

[76] Inventor: John H. Reid, 7 Stansbury Ct., Fredericksburg, Va. 22401

[ * ] Notice: The portion of the term of this patent subsequent to Jun. 19, 2001 has been disclaimed.

[21] Appl. No.: 433,638

[22] Filed: Oct. 12, 1982

Related U.S. Application Data

[63] Continuation-in-part of Ser. No. 361,205, Mar. 29, 1982, Pat. No. 4,455,232, which is a continuation-in-part of Ser. No. 75,412, Sep. 14, 1979, Pat. No. 4,394,268, which is a continuation-in-part of Ser. No. 28,383, Apr. 9, 1979, Pat. No. 4,278,547, which is a continuation-in-part of Ser. No. 848,705, Nov. 4, 1977, abandoned, which is a continuation-in-part of Ser. No. 649,995, Jan. 19, 1976, abandoned.

[51] Int. Cl.$^4$ .................................................. C02F 3/20
[52] U.S. Cl. ..................... 210/194; 210/220; 210/926; 210/261; 261/DIG. 75; 261/124; 261/93
[58] Field of Search ............ 210/627, 629, 194, 195.3, 210/170, 219, 220, 221.1, 221.2, 628, 319, 320, 926, 200, 261; 261/36 R, 91, 93, 124, DIG. 75

[56] References Cited

U.S. PATENT DOCUMENTS 4,226,717 10/1980 Malm .................................. 210/926
4,362,625 12/1982 Beard .................................. 210/170
4,383,922  5/1983 Beard .................................. 210/926

OTHER PUBLICATIONS

Brochure of Mixing Equipment Co., Inc., Rochester N.Y.
Newspaper article on p. 17 of Pine Bluff Commercial, Nov. 11, 1981.
Brochure of Innovatech Inc.; Valley Forge. Pa.

Primary Examiner—Benoit Castel
Attorney, Agent, or Firm—Marion P. Lelong

[57] ABSTRACT

An improved barrier oxidation ditch is provided which has an inclined duct for the induced flow, whereby energy in the dammed-up momentum is more efficiently released. This induced-flow duct is inclined at 30° to 60° to the horizontal, preferably 45°, and is disposed upstream of, downstream of, or alongside of the circular-/aerator in the intake channel. The induced-flow duct is preferably rectangular in cross-section and may have its downstream wall formed by the barrier if it is downstream of the circulator/aerator. It is connected at its lower end to the discharge duct to initiate a combined-flow portion thereof. An in-channel clarifier, disposed in the discharge channel so that its upstream wall is the barrier and its solid bottom is the ceiling of the combined-flow portion of the discharge duct, provides prolonged bubble retention time at maximum hydraulic pressure, whereby the efficiency of oxygen transfer is increased.

29 Claims, 10 Drawing Figures

BARRIER OXIDATION DITCH HAVING INCREASED FLOW EFFICIENCY AND OXYGEN TRANSFER EFFICIENCY

CROSS REFERENCE TO RELATED APPLICATIONS

This application is a continuation-in-part: of Ser. No. 361,205, filed Mar. 29, 1982, entitled "Method and Apparatus for Induced-flow Circulation and Pressurized Aeration, in a Barrier Oxidation Ditch", now U.S. Pat. No. 4,455,232; which is a continuation-in-part of Ser. No. 75,412, filed Sept. 14, 1979, entitled "Conversion of Plug Flow and Complete Mix Aeration Basins to Barrier Oxidation Ditches", now U.S. Pat. No. 4,394,268; which is a continuation-in-part of Ser. No. 28,383, filed Apr. 9, 1979, entitled "Conservation of Monmentum in a Barrier Oxidation Ditch" and now U.S. Pat. No. 4,278,547, issued July 14, 1981; which is a continuation-in-part of Ser. No. 848,705, filed Nov. 4, 1977, entitled "Flow Control Apparatus and Process for an Oxidation Ditch"0 of John Hager Reid, and now abandoned; which is a continuation-in-part of Ser. No. 649,995, filed Jan. 19, 1976, entitled "Flow Control Apparatus and Method for Aerobic Sewage Treatment" of John Hager Reid, now abandoned.

BACKGROUND OF THE INVENTION

1. Field of the Invention

This invention relates to wastewater treatment. The invention especially relates to methods and apparatuses for clarifying mixed liquor in activated sludge processes that are conducted in oxidation ditches of racetrack or loop channel configuration or in conventional complete mix tanks.

2. Review of the Prior Art

Oxidation ditches for continuous aerobic treatment of liquid wastewaters have been used since the early 1950's. They were developed in Holland by Dr. Ir A. Pasveer, as a variation of the activated sludge process, and were patented in Dutch Pat. No. 87,500 and British Pat. No. 796,438.

Barrier oxidation ditches have been operating since 1977, primarily for treating municipal and poultry processing wastewaters. Barrier oxidation ditches are described in U.S. Pat. No. 4,260,486 of John H. Reid, which is fully incorporated herein by reference. A barrier oxidation ditch comprises an endless channel, a barrier disposed athwart the channel, a vertically mounted pump having an impeller within a draft tube which is vertically mounted at the upstream side of the barrier, a J-shaped discharge duct which is flow-connected to the draft tube and is mounted below the bottom of the channel and below the barrier to provide a discharge on the downstream side thereof, and an aeration means which includes a sparge disposed beneath the impeller, and, if needed, diffusers which are removably mounted so that they introduce additional diffused air at about the bottom of the discharge duct. This barrier oxidation ditch, which pumps all of the circulating mixed liquor past the barrier, is herein described as a total barrier oxidation ditch.

It has further been ascertained that the barrier oxidation ditch of U.S. Pat. No. 4,260,486 creates a differential hydraulic head that is readily measurable when the flow is being pumped through one or more draft tubes and discharge ducts, thereby indicating that there exists a dammed-up momentum in the mixed liquor which is approaching the barrier. It is important to release the energy contained in the dammed-up momentum.

An improved barrier oxidation ditch is disclosed in U.S. Pat. No. 4,278,547 of John H. Reid; it is also incorporated herein by reference. This ditch comprises a barrier having adjustably sized openings and/or gateways therethrough for conserving the momentum of the mixed liquor, a pump means for pumping most of the liquor past the barrier, and an aeration means for aerating the pumped liquor and for selectively aerating the induced-flow liquor passing through the openings so that there is no backmixing of aerated liquor and can be relatively little heterogenous aeration when the aerated pumped liquor is blended, downstream of the barrier, with the induced-flow liquor. This barrier oxidation ditch, which pumps a portion of the circulating mixed liquor past the barrier and provides openings for the remainder to move through the barrier is herein described as a partial barrier oxidation ditch.

One of the major benefits of the barrier oxidation ditch of U.S. Pat. No. 4,260,486 is that the sparge in the downdraft tube provides for introducing diffused air to the mixed liquor at a shallow depth, thereby forming an air-liquor mixture, and then for pumping this mixture downwardly with its impeller into the discharge duct to a sub-channel oxygen-transfer depth, at the lowest portion of the discharge duct, that is well below the channel bottom. This oxygen-transfer depth increases the driving force for transferring oxygen molecules across the films at the gas-liquid interfaces, of the air bubbles. Other additional benefits of great practical importance are: (1) the energy required for downwardly pumping the air-liquor mixture is considerably less than the energy required for downwardly pumping the liquor alone and for separately compressing air to the hydraulic pressure existing at the oxygen-transfer depth; and (2) a very high level of turbulence is provided in the oxygen-transfer zone, measured by brake horsepower/1000 $ft^3$.

For any aeration system used in transferring oxygen to a particular wastewater, sewage, or mixed liquor, its oxygen transfer efficiency is a function of five major parameters: bubble size, bubble retention time, driving force across the air-liquid interface for the dissolved oxygen, hydrostatic pressure, and degree of turbulence in the oxygen-transfer zone. However, the adjustable gateways through the barrier of U.S. Pat. No. 4,278,547 allow the induced-flow portion of the mixed liquor to pass through the barrier and be aerated at a depth above the channel bottom instead of at the sub-channel depth that is available within a discharge duct, thereby losing at least some of the advantages of retention time, driving force, hydrostatic pressure, and possibly even turbulence.

Ser. No. 361,205 of John H. Reid, now U.S. Pat. No. 4,455,232, accordingly discloses a barriered circulator-/aerator in the endless channel of a barrier oxidation ditch which provides a directly pumped flow of mixed liquor into a central liquor inlet zone and an induced flow of mixed liquor into a surrounding liquor inlet zone at the inlet of a deep oxygen contact duct which passes beneath the barrier to the discharge channel on the downstream side thereof. It further provides mixing of diffused air with the directly pumped flow and/or the induced flow and then moving the combined air-liquor flows into the deepest portion of the contact duct where point-source pressurized aeration of both flows occurs. Eddy jet diffusers are preferably used for aerating the induced flow. Oxygen transfer efficiencies are obtained that are 1.6 to 2.2 times as great per brake horsepower per hour as that attainable by 100% pumping of the mixed liquor in a total barrier oxidation ditch, as disclosed in U.S. Pat. No. 4,260,486.

This improved barrier oxidation ditch, however, compels 100% of the flow, both pumped and induced, to change direction 90° while moving downwardly and then to change direction 135° while moving beneath the barrier and upwardly. As is well known in hydraulic theory, such 225° of direction changing causes significant energy consumption. It would be desirable to provide a means for passing the liquor from the intake channel to the discharge channel with minimum directional change.

When the air-liquor mixture has reached the lowest portion of the discharge duct, there is also very little time available for oxygen transfer from bubble to liquor across the films of the liquor-gas interface before the liquor/air mixture begins to rise. Yet, it is at this point in passage from the intake channel to the discharge channel that transfer efficiency is highest because of maximum hydrostatic pressure. Another factor of importance is that the microorganisms are in an oxygen-starved condition and avidly utilize the oxygen as fast as it transfers across the liquor-air films into the bulk liquor, so that the bulk liquor cannot become saturated if the MLSS content is reasonably high. An unusually large proportion of the oxygen in the bubbles is accordingly able to transfer across the films into the bulk liquor. It would accordingly be desirable to prolong the bubble retention time at the maximum depth. However, simply lengthening the discharge duct, such as by thickening the barrier, tends to waste the available land area.

An elongated clarifier is described in U.S. Pat. No. 3,788,477 of Love, for use alongside complete-mix tanks. As described in this patent, flow of sludge from the sloping bottom of the clarifier into the adjacent mixing basin is limited by flow control plates and is picked up inside the mixing basin by the downward and inward flow of mixed liquor along the sides and bottom of the mixing basin. Use of sludge return pumps can thereby be avoided.

This clarifier was installed alongside the discharge channel in several barrier oxidation ditches during 1979 and 1980. However, in a barrier oxidation ditch, the flow is translational, not toroidal as in the mixing basin of a complete-mix system. It was consequently discovered that the sludge did not adequately slide out into the discharge channel of a barrier oxidation ditch but had to be pumped out of the clarifier because the turbulent translational flow in the discharge channel created a positive pressure that interfered with automatic discharge of the sludge.

In about 1979, a brochure entitled "Lightnin Treatment System" was published by Mixing Equipment Co., Rochester, N.Y., which schematically showed the integral clarifier of U.S. Pat. No. 3,788,477 disposed downstream of the circulator/aerator in a barrier oxidation ditch and also aligned transversely to the channel so that its upstream side formed the barrier and its downstream or discharge side was athwart the channel and immediately upstream of the terminus of the discharge duct. Moreover, the length of the clarifier, as illustrated, was shorter than its width and was, in fact, the same as the width of the channel. However, such an integral clarifier would, in most cases, be far too small to be combined with a barrier oxidation ditch.

If the size of the clarifier were to be increased by extending the discharge side or outer baffle to a location far down the discharge channel and past the end of the discharge duct, there would be such a pool of violently agitated air moving beneath the clarifier and boiling up past the sludge discharge space of the clarifier that its operation would be impossible. In addition to this discharging difficulty, the bottom of this sideways-extended clarifier would have such a slight slope that settled sludge would not slide downwardly toward the discharge space, whereby its operation would be unsuccessful for this reason as well.

As disclosed in U.S. Pat. No. 4,303,516 of Stensel et al, a rectangularly shaped clarifier is mounted in one or both channels of an oxidation ditch which has a mechanical aerator at one end, as taught in U.S. Pat. No. 3,510,110 of Klein. This clarifier has the same depth as the channel depth, but the channel bottom is excavated beneath the bottom of the clarifier to provide a submerged passage for the mixed liquor. The floor of the clarifier slopes toward the channel sidewall in one embodiment and terminates in a stilling plate that is spaced upwardly from the sidewall to provide a sludge discharge space therebetween. In another embodiment, the floor is horizontally disposed as spaced-apart rectangular plates having rectangular ports therebetween which are athwart the channel, each rectangular port having a shallowly inclined plate along its upstream edge and a steeply inclined plate along its downstream edge. The velocity of the flowing wastewater is increased as it passes beneath the plates so that sludge is drawn from the clarifier through the ports.

This Stensel et al clarifier might perform well if disposed in the return channel, opposite the barrier of a barrier oxidation ditch, or in its intake channel, but if disposed in its discharge channel and close to the barrier, the uprushing air from the discharge duct would enter the clarifier through the discharge ports of either embodiment and disastrously interfere with its operation.

SUMMARY OF THE INVENTION

It is, therefore, an object of this invention to provide a method and a means for minimizing the directional change of the liquor while it is passing from the intake channel to the discharge channel.

It is also an object to provide a method and a means for greatly prolonging the bubble retention time at maximum hydrostatic pressure, without increasing the thickness of the barrier as an unused portion of the endless channel and without wasting land area.

The first objective is attained according to the principles of this invention by providing an induced-flow duct which is inclined at about 30°-60° to the horizontal and is connected at its upper end to a separate induced-flow inlet which is disposed downstream or upstream of the draft tube and the pump or even alongside thereof. This inclined duct is connected at its lower end to the pumped-flow discharge duct at approximately its maximum depth, thereby initiating a combined-flow portion of the discharge duct, whereby venturi activity boosts the induced flow and supplies additional pumping power.

The induced-flow inlet may be either oval or rectangular in plan view, and the inclined duct may correspondingly be either circular, square, or rectangular in sectional view. The rectangular duct is preferably designed as a narrow slot which is transversely disposed across the intake channel and adjacent to the barrier; its height in sectional view may be 10%-50% of the average depth within the endless channel. The advantage of using a slot as the inclined duct for the induced flow is that there is less sidewise shifting and/or by-passing of flow in the discharge channel. This advantage is especially pertinent if the discharge duct for the pumped flow fans and flattens out to meet it. In addition, the combined pumped and induced flows within the combined-flow section of the discharge duct are fully developed in the desired direction and are subject to less random turbulence.

The second objective is attained according to the principles of this invention by providing a rectangular clarifier which is disposed within the channel and above the combined-flow portion of the discharge duct. This clarifier is preferably rectangular in section and has a width ranging from the width of the combined-flow portion of the discharge duct to at least the width of the channel. Indeed, the width of the clarifier can be considerably greater than the channel width.

The height of this rectangular combined-flow portion is preferably less than the depth of the liquor in the endless channel under average conditions but may be selectively designed to be from one-fifth to the full channel depth under average conditions. The velocity of the air-liquor mixture is consequently at least equal to the velocity in the channel and may be at least five times as much. Such increased velocity is generally preferred because it tends to prevent the bubbles from rising and coalescing by maintaining turbulent flow conditions. Baffles and bubble-splitting devices can also be installed in the combined-flow portion of the duct so as to maintain the bubbles at minimum size. The upstream wall of the clarifier is also the barrier athwart the endless channel, and this upstream wall may be provided with an inward slope to form the downstream inclined side of a rectangular induced-flow duct. This is inclined at 30°-60° to the horizontal, preferably at 45°. In addition, the downstream wall of the clarifier may be provided with an inward slope, such as 60°-75°, that is suitable for the terminus of the combined-flow portion of the discharge duct.

BRIEF DESCRIPTION OF THE DRAWINGS

The invention may be readily understood by referring to the drawings in which FIGS. 1, 4, and 6-10 show a portion of a barrier oxidation ditch having slab-sided discharge passages and FIGS. 2, 3, and 5 show portions of barrier oxidation ditches having cylindrical passages. FIGS. 1-5, 9, and 10 show induced-flow ducts which are downstream of the circulator/aerator, but FIGS. 6-8 shows an induced-flow duct which is upstream thereof.

DESCRIPTION OF THE PREFERRED EMBODIMENTS

The barrier oxidation ditch of this invention, as seen in FIGS. 1-6, has a separate induced-flow duct which is upstream or downstream of the circulator/aerator and which is connected to the discharge duct at its maximum depth. An eddy jet header, or other type of $O_2$-containing gas diffuser is optionally disposed at the inlet of the induced-flow duct. In consequence, the induced flow, bearing dispersed air bubbles from the eddy jets, joins the pumped flow at full depth and can be regulated separately from the pumped flow.

Figure 1:
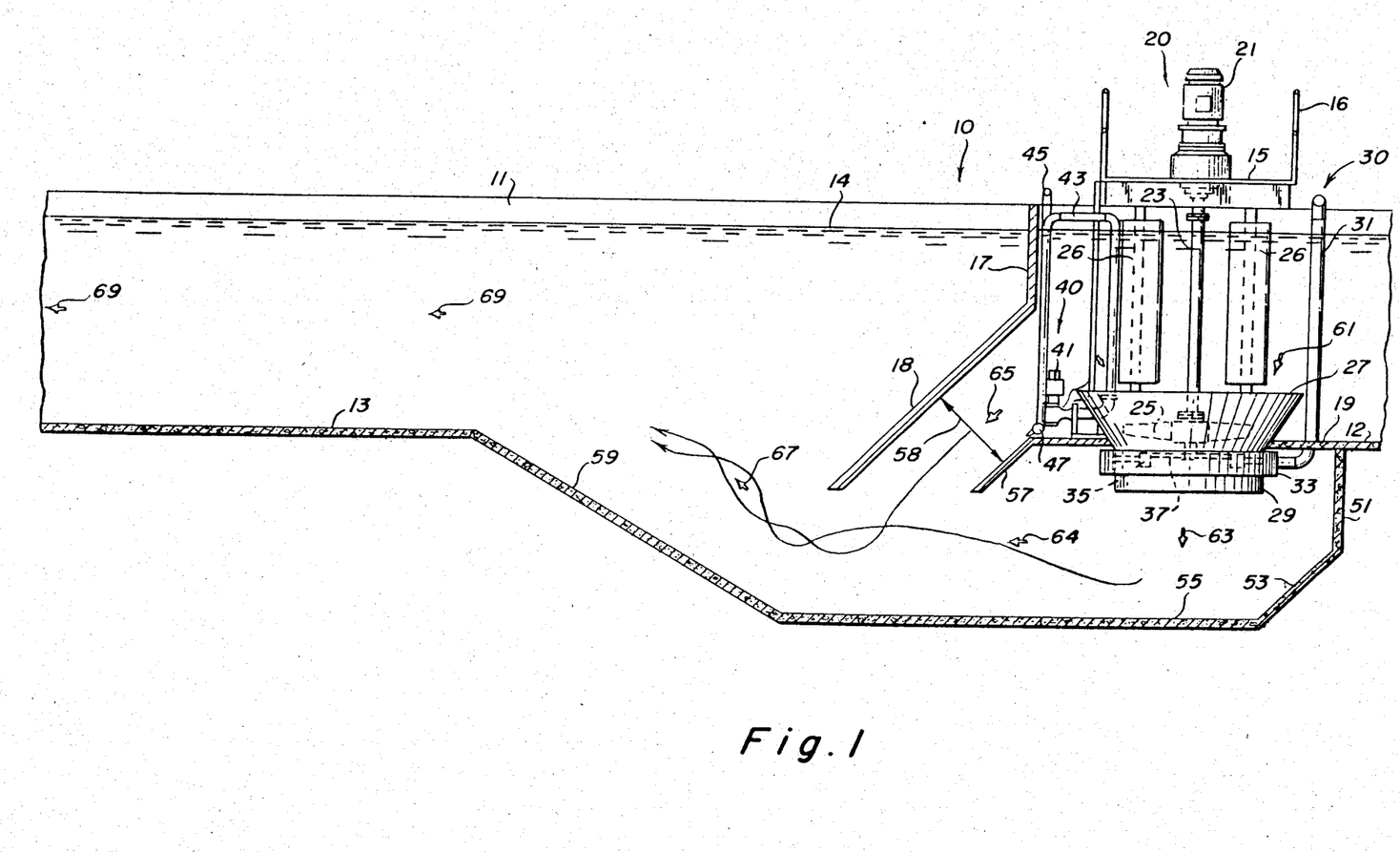
FIG. 1 is a sectional elevational view of a circulator/aerator and a barrier of a barrier oxidation ditch in which the downdraft tube and the inclined induced-flow duct discharge into an underlying discharge zone.
Figure 2:
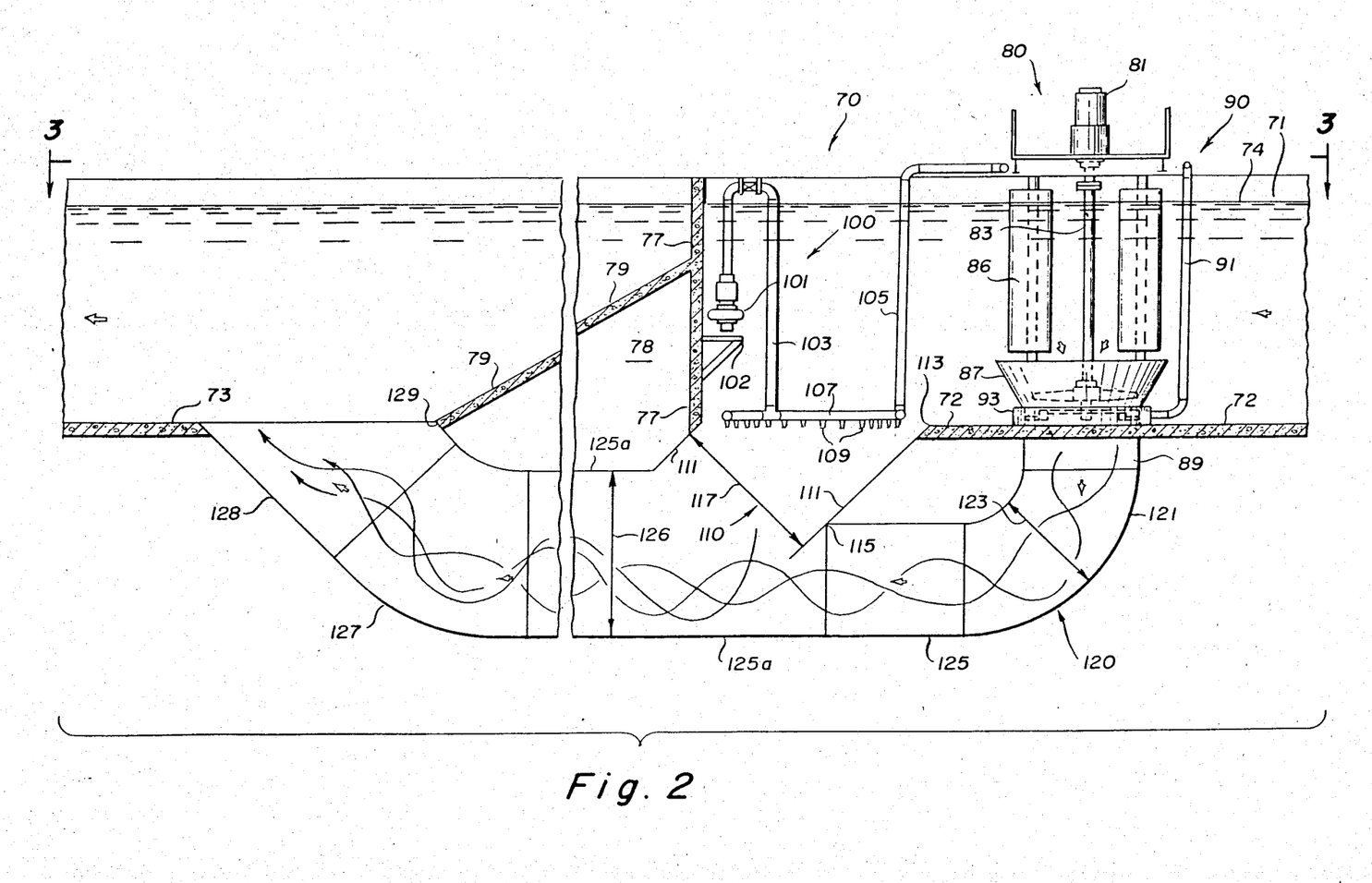
FIG. 2 is a sectional elevational view of a barrier oxidation ditch in which both the downdraft tube of the circulator/aerator and the inclined induced-flow duct are flow connected to a discharge duct of circular cross-section.
Figure 3:
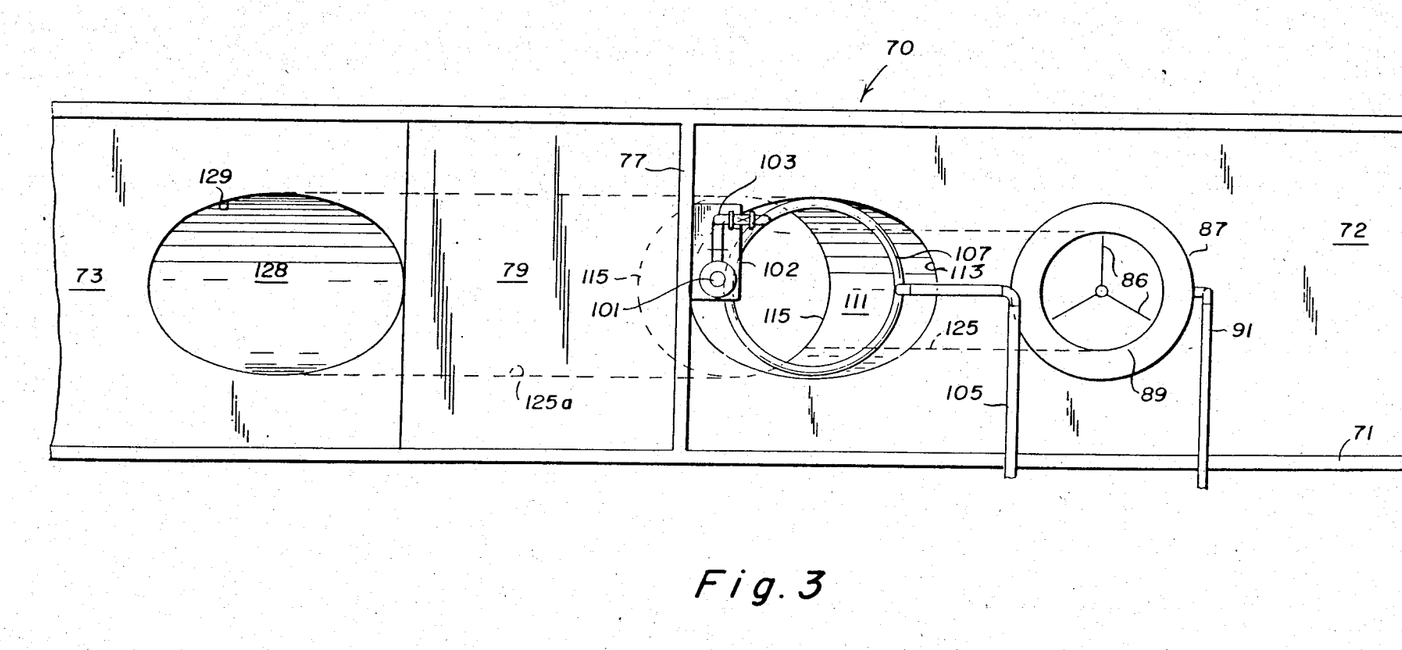
FIG. 3 is a plan view of the apparatus shown in FIG. 2.
Figure 4:
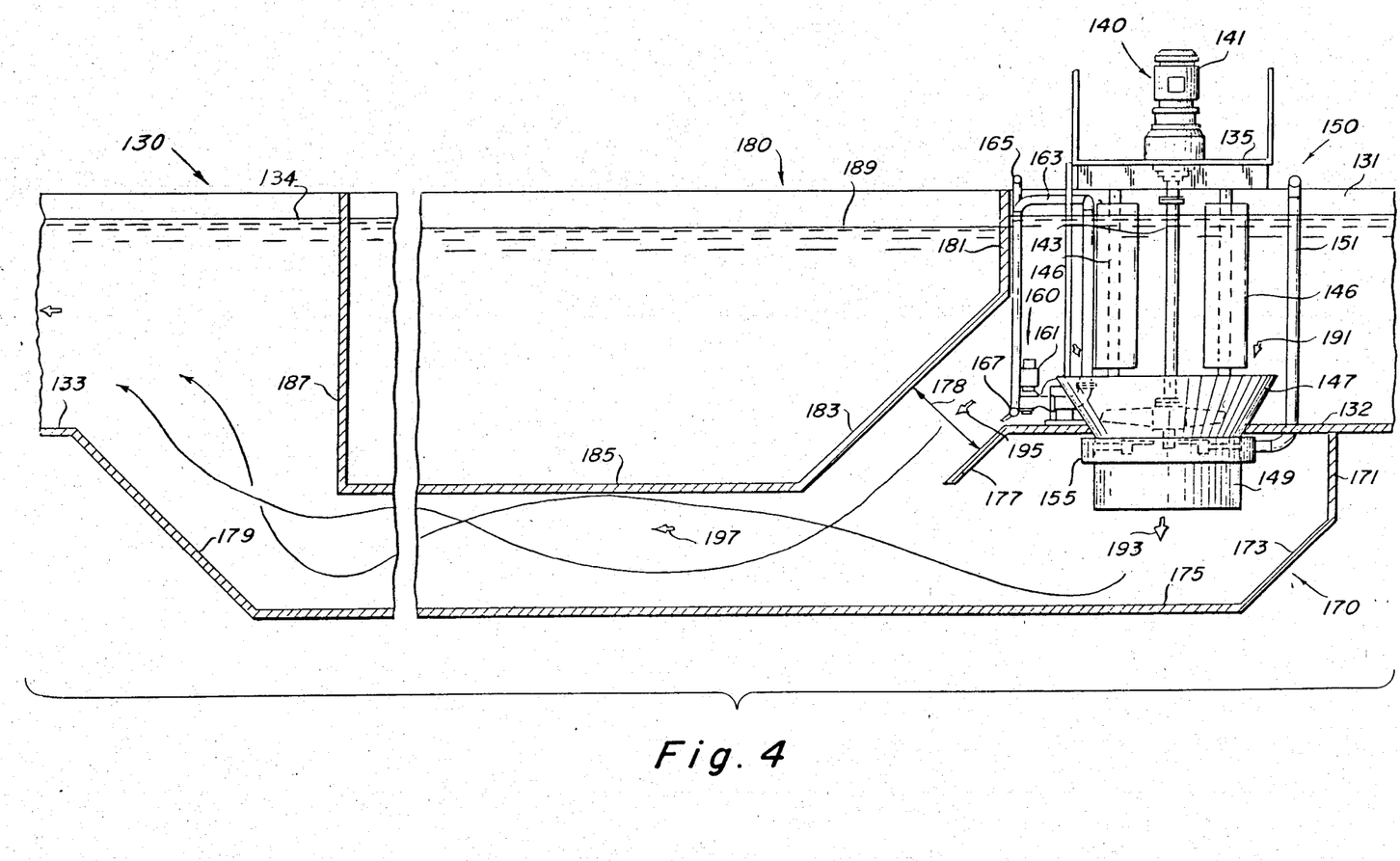
FIG. 4 is a sectional elevational view of a barrier oxidation ditch which has the underlying discharge zone seen in FIG. 1 and an in-channel clarifier forming the barrier and the slot-shaped induced-flow duct.
Figure 5:
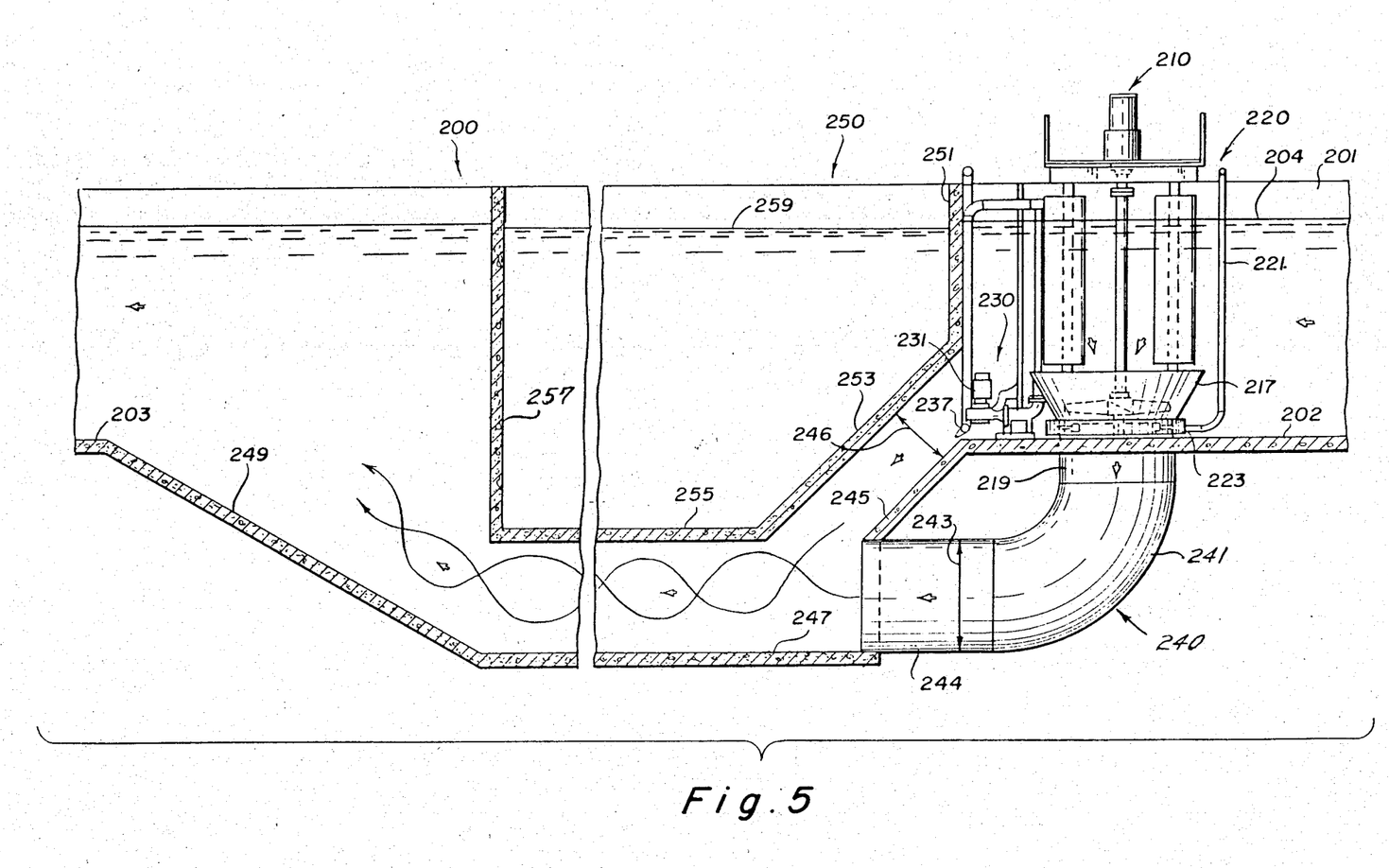
FIG. 5 is a sectional elevational view of a barrier oxidation ditch which is similar to the ditch of FIGS. 2 and 3 except that an in-channel clarifier is above the rectangularly shaped combined-flow section of the discharge duct, after junction of the discharge duct with the inclined induced-flow duct, and cooperatively forms the barrier and the upstream wall of the rectangular induced-flow duct.
Figure 6:
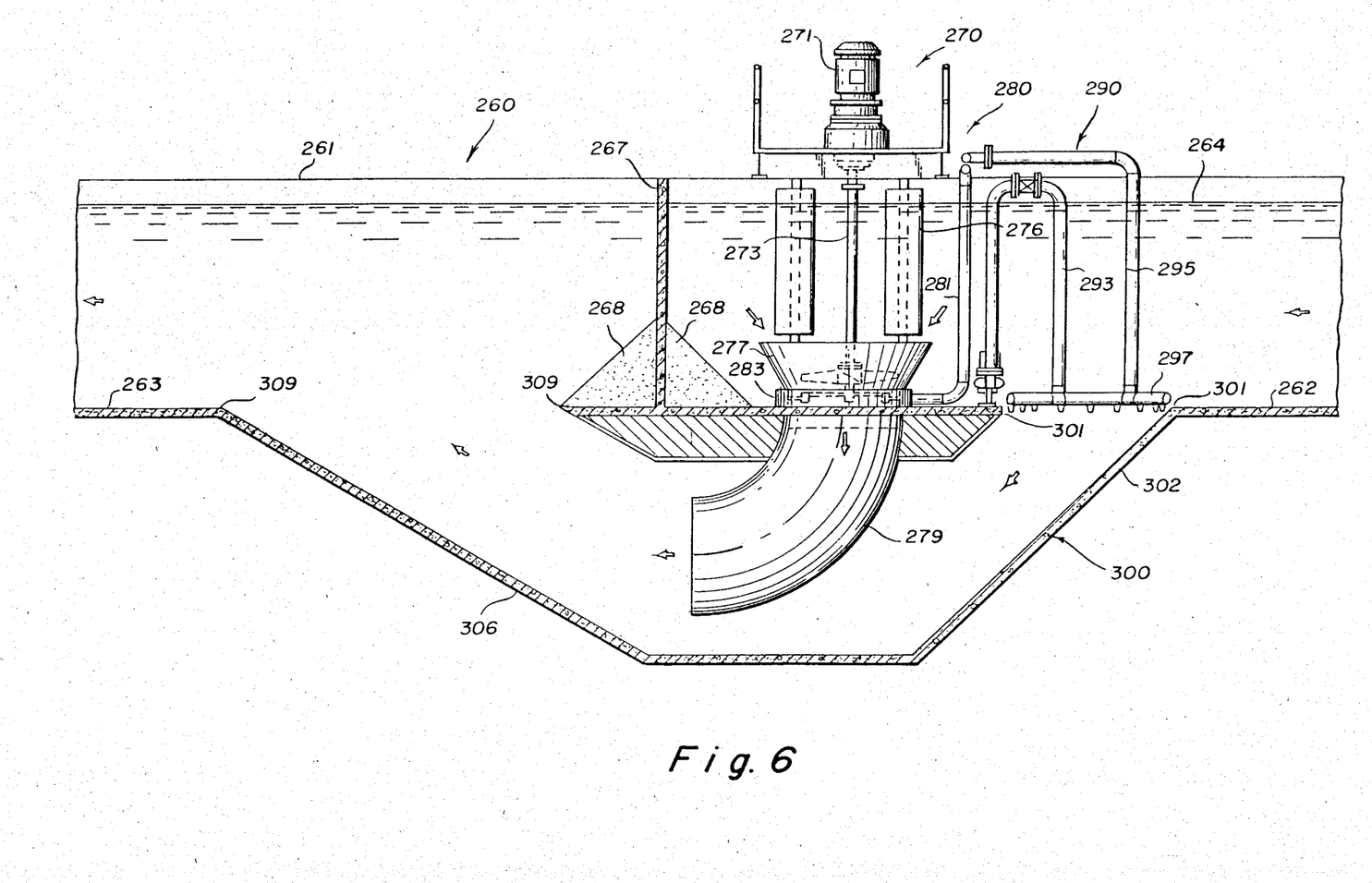
FIG. 6 is a sectional elevational view of a barrier oxidation ditch having a U-shaped induced-flow duct into which the curved downdraft tube projects at maximum depth so that the duct thereafter becomes a combined-flow duct.

The induced-flow duct, as seen in FIGS. 2, 3, and 6 can be cylindrical in shape and can be connected to a cylindrical discharge duct. Preferably, however, the induced-flow duct is slot-shaped, as seen in FIGS. 1, 4, and 5. The U-shaped duct of FIG. 6 can be cylindrical, oval, or rectangular, for example, in cross-section. It is highly preferred, moreover, that the slot-shaped or rectangular duct be formed by the upstream surfaces of an in-channel clarifier which also functions as the ceiling of the combined-flow section of the discharge duct and extends the length of the discharge duct up to several hundred feet, such as the entire length of one side of the endless channel, whereby substantially all of the oxygen in the bubbles can be consumed. A more typical length, however, is as little as 25 feet for a very small ditch to about 125 feet for a one-mgd barrier oxidation ditch.

FIG. 1 shows a portion of a slab-sided barrier oxidation ditch 10, comprising a circulator/aerator 20, a sparge assembly 30, an eddy jet assembly 40, and a discharge duct 50. Ditch 10 also comprises an endless channel having sides 11 and containing mixed liquor having an average depth indicated by surface 14. The endless channel is divided into an intake channel, having bottom 12, and a discharge channel, having bottom 13, by a barrier formed by a vertical portion 17 and an inclined portion 18. A walkway 15, having railings 16, spans the intake channel. The slab-sided design offers considerable savings in construction costs.

Circulator/aerator 20 comprises a motor and reduction gear 21, a shaft 23 which is connected thereto at its upper end, an impeller 25 on the lower end of shaft 23, an intake funnel 27 which surrounds impeller 25, a downdraft tube 29 which is flow connected to funnel 27, and vanes 26. Sparge assembly 30 comprises an air supply line 31, a sparge header 33, a sparge ring 35, and sparge fingers 37. Eddy jet assembly 40 comprises a submerged pump 41, a liquor supply line 43, an air supply line 45, and an eddy-jet header 47.

Discharge duct 50 comprises a vertical upstream wall 51, an inclined upstream wall 53, a bottom 55, an inclined downstream wall 57, and a discharge ramp 59. Wall 57 and inclined barrier 18 form the slot-shaped induced-flow duct which extends across the intake channel. Discharge duct 50 functionally comprises a turbulent impact section which underlies circulator/aerator 20, a venturi section which underlies the outlet of the induced-flow slot, and a discharge or combined-flow section above ramp 59.

The flow pattern that is involved for pumping and aerating in ditch 10 consequently comprises a downwardly moving intake flow 61, a downwardly moving pumped flow 63, a translationally moving pumped flow 64, an induced flow 65, a combined discharge flow 67, and a discharge channel flow 69.

Barrier oxidation ditch 70, shown in FIGS. 2 and 3, comprises sides 71, intake channel bottom 72, a discharge channel bottom 73, average liquor surface 74, vertical barrier 77, filled-in area 78, discharge slope 79, a circulator/aerator 80, a sparge assembly 90, an eddy jet assembly 100, an induced-flow duct 110, and a discharge duct 120. Circulator/aerator 80 comprises a motor and reduction gear 81 to which its shaft 83 is attached, vanes 86, an intake funnel 87, and a downdraft tube 89. Sparge assembly 90 comprises an air supply line 91 and a sparge header 93. Eddy jet assembly 100 comprises a submersible pump 101 which is attached to a small stand 102, a liquor supply line 103 which is connected to pump 101, an air supply line 105, a circular header 107 to which lines 103 and 105 are flow connected, and a plurality of eddy jets 109.

Induced-flow duct 110 has a circular side 111, upper edge 113, lower edge 115, and diameter 117. Discharge duct 120 comprises a 90° section 121 having diameter 123 which is flow connected to downdraft tube 89, a straight section 125 which is flow connected to section 121 and enlarged to diameter 126 after juncture with duct 110, a 45° section 127, and a terminal section 128 having an oval junction 129 with bottom 73 of the discharge channel. The combined-flow portion of discharge duct 120 underlies filled-in area 78.

Barrier oxidation ditch 130, shown in FIG. 4, comprises sides 131, bottom 132 of the intake channel, bottom 133 of the discharge channel, average liquor surface 134, at least one circulator/aerator 140, a sparge assembly 150, an eddy jet assembly 160, a discharge duct 170, and an in-channel clarifier 180. Circulator/aerator 140 comprises vanes 146, an intake funnel 147, and a downdraft tube 149. Sparge assembly 150 comprises an air supply line 151 and a sparge header 153. Eddy jet assembly 160 comprises a pump 161, a liquor supply line 163, an air supply line 165, and an eddy jet header 167.

Discharge duct 170 comprises an upstream wall 171, an inclined wall 173, a bottom 175, an upstream wall 177 of the slot-shaped induced-flow duct, and a discharge ramp 179. Clarifier 180 comprises an upstream wall 181 which functions as a vertically disposed barrier, an inclined wall 183 which is connected to wall 181 and functions as both an inclined barrier and the downstream surface of the induced-flow duct, bottom 185 which defines the upper surface of the combined-flow section of discharge duct 170 after juncture with the induced-flow duct, and downstream wall 187. Clarifier 180 is provided with pumps and/or syphons to remove sludge and clarifier liquor. The rectangular induced-flow duct, between walls 177 and 183, has width 178.

The flow pattern in FIG. 4 includes intake flow 191, pumped discharge flow 193, induced flow 195, combined flow 197, and discharge flow 199. The entire length of discharge duct 170 beneath bottom 185 is the combined-flow portion of this duct.

The barrier oxidation ditch 200 shown in FIG. 5 has an endless channel with sides 201, an intake channel with bottom 202, a discharge channel with bottom 203, and average liquor level 204. Ditch 200 also comprises a circulator/aerator 210, a sparge assembly 200, an eddy jet pump assembly 230, a discharge duct 240, and an in-channel clarifier 250.

Circulator/aerator 210 comprises an intake funnel 217 and a downdraft tube 219. Sparge assembly 220 comprises an air supply line 221 and a sparge header 223. Eddy-jet pump assembly 230 comprises a submerged pump 231 and an eddy-jet header 237.

Discharge duct 240 comprises a 90° section 241, a straight fan-out section 244 with flat sides, bottom, and top having height 243, an inclined wall 245 as the upstream wall of the induced-flow duct, bottom 247 of the slot-shaped portion beneath clarifier 250, discharge ramp 249. Section 244 is preferably fan-shaped from the circular outlet of section 241 to the channel-wide bottom of wall 245 and the channel-wide upstream edge of bottom 247.

Clarifier 250 comprises vertically disposed upstream wall 251, inclined wall 253, bottom 255, and downstream wall 257. Walls 251 and 253 function as the barrier for ditch 200, and wall 253 additionally functions as the downstream surface of the induced-flow duct having width 246. Bottom 255 also functions as the top surface of the combined-flow portion of discharge duct 240 after juncture with the induced-flow duct.

The barrier oxidation ditch 260 shown in FIG. 6 has an induced-flow inlet which is upstream of its circulator/aerator 270 for release of the dammed-up momentum in the intake channel. Barrier oxidation ditch 260 has an endless channel with sides 261, an intake channel with bottom 262, a discharge channel with bottom 263, average liquor level 264, and barrier 267 having a base 268. Ditch 260 also comprises a circulator/aerator 270, a sparge assembly 280, an eddy-jet assembly 290, and an induced-flow/discharge duct 300.

Circulator/aerator 270 comprises a motor and reduction gear 271, a shaft 273 which is connected thereto, vanes 276, and a curved downdraft tube 279 having diameter 278. Sparge assembly 280 comprises an air supply line 281 and a sparge header 283. Eddy jet assembly 290 comprises a pump 291, a liquor supply line 293, an air supply line 295, and an eddy-jet header 297.

Induced-flow/discharge duct 300 comprises an induced-flow inlet having edges 301, an induced-flow portion 302, a venturi or mixing portion 304, a combined-flow portion 306, and an outlet having edges 309.

The inlet and the outlet may have any desired shape, from circular to rectangular.

Duct 300 is preferred because of its minimum directional change for the induced flow, its capability of "pulling" the induced flow with the pumped flow, the gradualness of its bends, and the capability of locating its inlet at any desired distance upstream, whereby contact with the bubbles can be selectively prolonged. As with any other eddy-jet assembly 40, 100, 160, 230, the air bubbles issuing from the jets can be adjusted in size. By employing very small bubbles, a comparatively slow current entering the inlet can be used to carry them down, and an additional advantage is obtained because their comparatively large surface area enhances oxygen transfer to the bulk of the mixed liquor.

Any clarifier 180, 250, having sloped upstream ends, can also be used in the discharge channel if mixing portion 304 is lengthened to enable the combined induced and pumped flows to move horizontally therebeneath, and, of course, the upstream wall of any such clarifier can serve as barrier 267.

Figure 7:
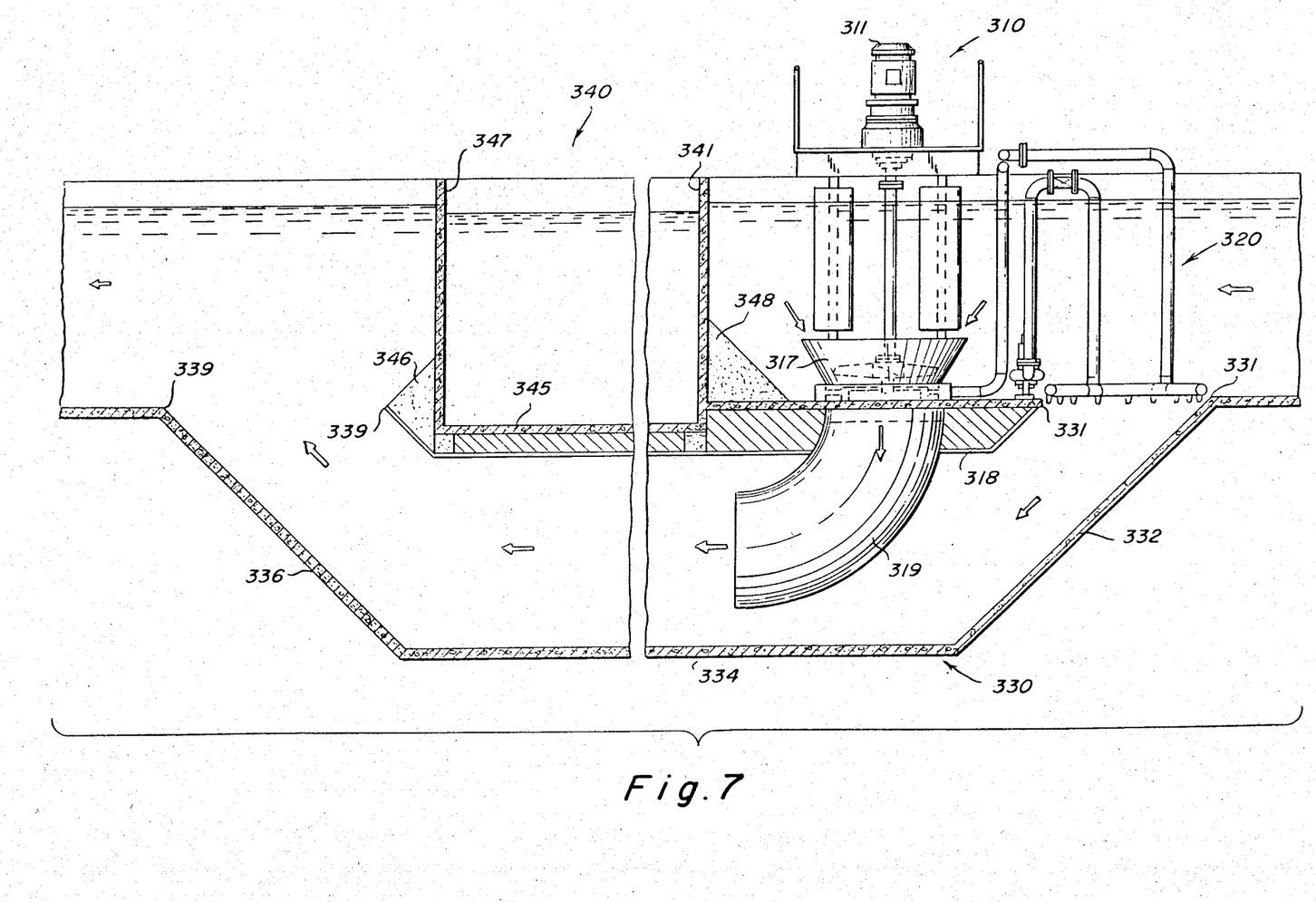
FIG. 7 is similar to FIG. 6 except that the barrier and the roof of the combined-flow duct are formed by an in-channel clarifier.

Circulator/aerator assembly 310, eddy-jet assembly 320, and discharge duct 330 in FIG. 7 are similar to the corresponding elements of the barrier oxidation ditch shown in FIG. 6 except that in-channel clarifier 340 furnishes its upstream side 341 as the barrier. Circulator/aerator assembly 310 includes motor and reduction gear 311, funnel 317, aerator bridge 318, and curved downdraft tube 319. Discharge duct 330 includes an inlet having edges 331 at its intersection with the bottom of the intake channel, induced-flow portion 332, combined-flow portion 334, combined-flow portion 336, and an outlet having edges 339 at its intersection with the bottom of the discharge channel. Clarifier 340 includes upstream side 341, bottom 345 which is the roof of combined-flow portion 334, and downstream wall 347; all four sides and bottom 345 intersect at right angles. Abutments 346 and 348 are at the exterior bottom edges of sides 341 and 347, respectively. The flow patterns through circulator/aerator assembly 310 and through discharge duct 330 are essentially the same as in the barrier oxidation ditch shown in FIG. 6 except for the effects of the added clarifier.

Figure 8:
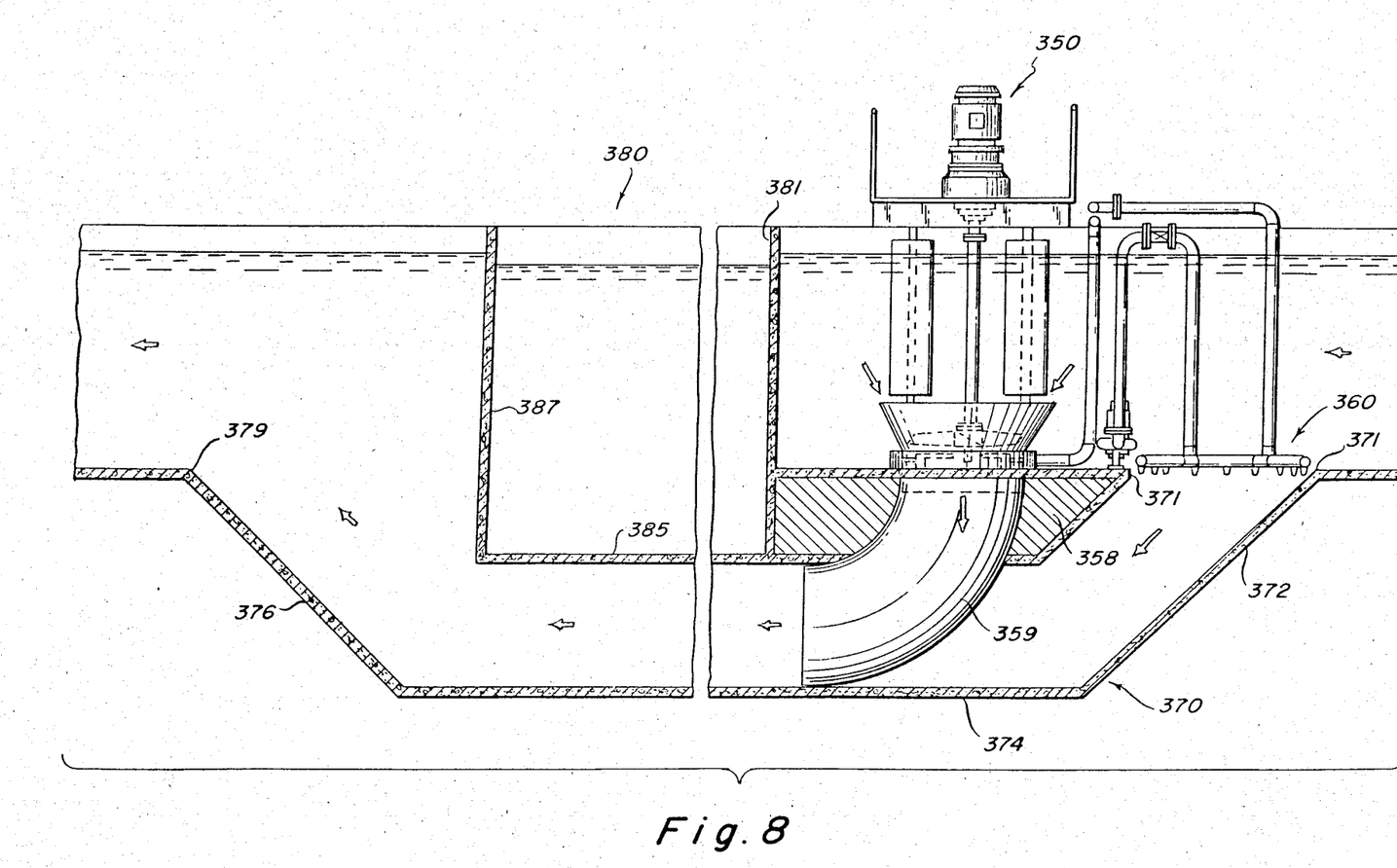
FIG. 8 is similar to FIG. 7 except that the combined-flow duct has the same depth as the diameter of the curved draft tube.

Circulator/aerator assembly 350, eddy-jet assembly 360, discharge duct 370, and in-channel clarifier 380 that are shown in FIG. 8 are very similar to the corresponding elements shown in FIG. 7 except that clarifier 380 is deeper than clarifier 340 so that aerator bridge 358 is thicker and the height of discharge duct 370 is less than the height of duct 330 and indeed may be no greater than the diameter of curved downdraft tube 359. Discharge duct 370 comprises an inlet having edges 371 at its intersection with the bottom of the intake channel, an induced-flow portion 372, a combined-flow portion 374, a discharge portion 376, and an outlet having a downstream edge 379 at its intersection with the bottom of the discharge channel. Clarifier 380 comprises an upstream side 381, a bottom 385, and a downstream side 387, all meeting at right angles. Combined-flow portion 374 must be appreciably wider than the diameter of downdraft tube 359 and is preferably as wide as clarifier 380. The flow patterns for the barrier oxidation ditch of FIG. 8 are essentially the same as the patterns for the barrier oxidation ditch of FIG. 7.

Figure 9:
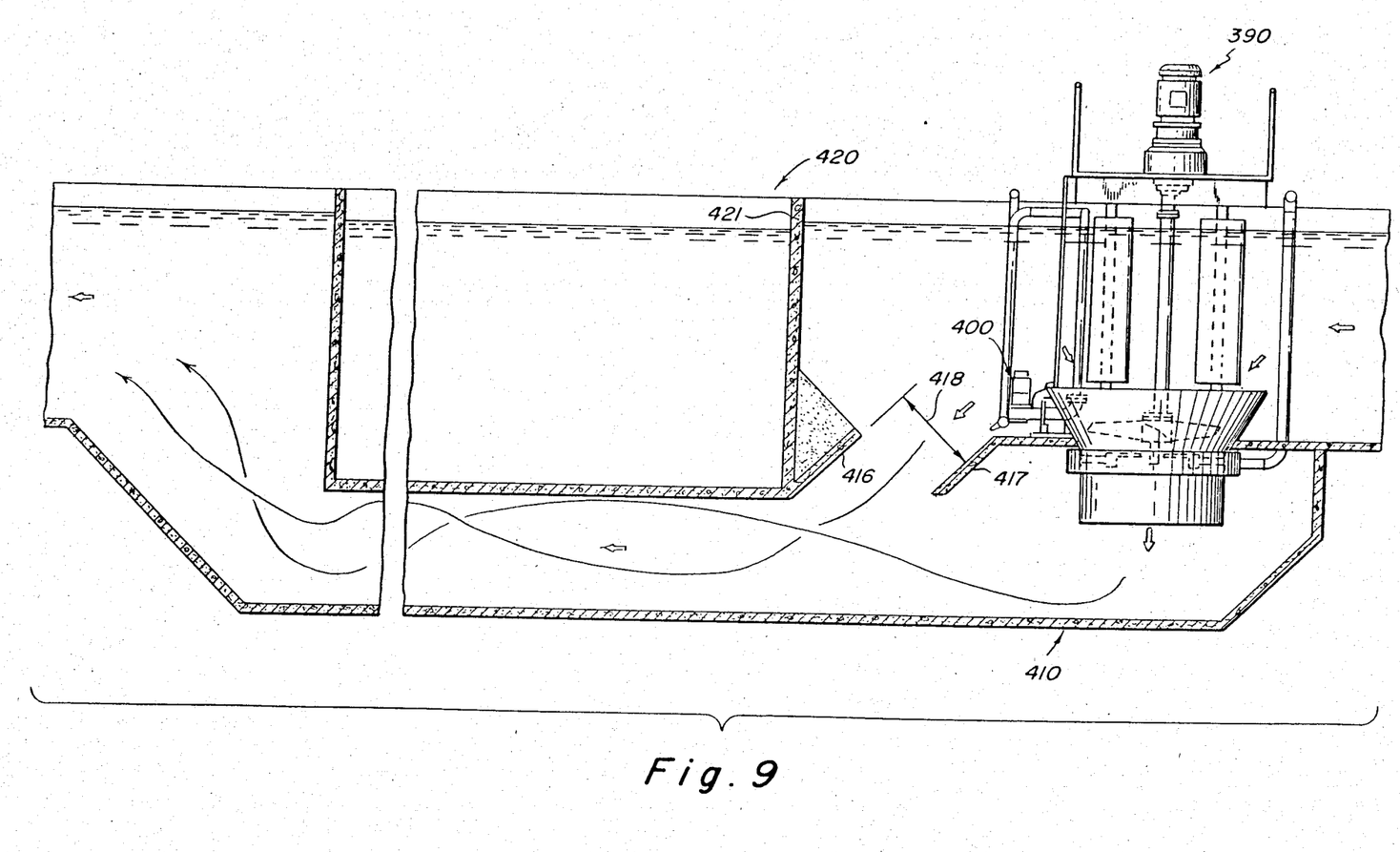
FIG. 9 is similar to FIG. 4 except that the clarifier has a perpendicular upstream end.

Circulator/aerator assembly 390, eddy-jet assembly 400, discharge duct 410, and clarifier 420 in FIG. 9 are very similar to the corresponding elements shown in FIG. 4 except that clarifier 420 has a perpendicular upstream end 421 and the intake duct has a downstream side 416, in parallel to upstream side 417 and separated therefrom by width 418, which is external to clarifier 420. In all other respects, this barrier oxidation ditch and its clarifier 420 function in the same manner as barrier oxidation ditch 130 and its clarifier 180.

Figure 10:
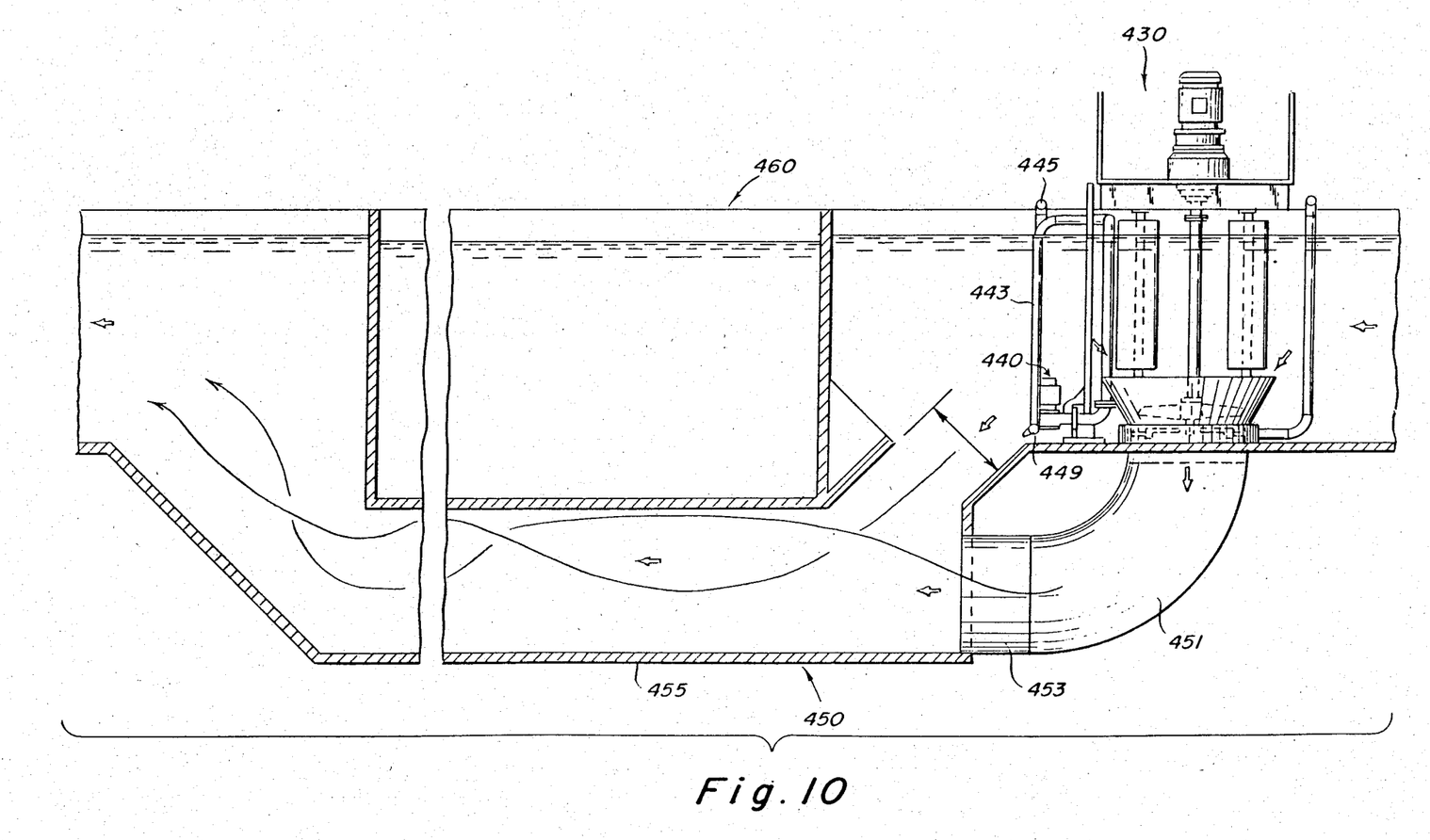
FIG. 10 is similar to FIG. 2 except that a perpendicular-end clarifier forms the barrier and the roof of the combined-flow portion of the discharge duct.

The portion of the barrier oxidation ditch shown in FIG. 10 is very similar to the portion shown in FIGS. 2 and 3. One difference is that in-channel clarifier 460 forms the barrier and the roof of its slot-type discharge duct 450 which is formed of concrete except for 90° bend portion 451 and straight section 453. Another difference is that a single row of eddy jets 409 are directed toward the slot-type induced-flow duct, instead of a ring thereof as seen in FIG. 2. The header for jets 449 is fed by liquor line 443 and compressed-air line 445. In most essential respects, however, this barrier oxidation ditch functions very much like ditch 70 of FIGS. 2 and 3.

Because it will be readily apparent to those skilled in the wastewater treatment art that innumerable variations, modifications, applications, and extensions of the examples and principles hereinbefore set forth can be made without departing from the spirit and the scope of the invention, what is herein defined as such scope and is desired to be protected should be measured, and the invention should be limited, only by the following claims.

What is claimed is:

1. In a barrier oxidation ditch comprising an endless channel and a barrier which is sealably disposed thereacross for dividing said endless channel into at least one intake channel portion upstream of said barrier and a discharge channel portion downstream of said barrier, at least one circulator/aerator comprising:
  (a) a pump/aerator including:
    (1) a draft tube in fluid communication with said intake channel portion;
    (2) an impeller operably mounted within said draft tube; and
    (3) air sparge means disposed beneath said impeller;
  (b) an induced flow duct having an inlet at one end which is in fluid communication with said intake channel portion, said induced flow duct being downwardly inclined in a downstream direction at a predetermined acute angle in the range of approximately 30° to 60° below horizontal and having an outlet at the other end; and
  (c) a discharge duct disposed to pass beneath said barrier at a selected maximum depth, said discharge duct comprising:
    (1) a pumped flow portion in fluid communication with said intake channel portion through said draft tube, said pumped flow portion having an outlet end; and
    (2) a combined flow portion having an inlet at one end which is in fluid communication with the outlet end of said pumped flow portion and the outlet end of said induced flow duct, and having a terminal segment at the other end which is in fluid communication with said discharge channel portion.

2. A circulator/aerator in accordance with claim 1 wherein the inlet of said induced flow duct is disposed upstream of said draft tube.

3. A circulator/aerator in accordance with claim 2 wherein the inlet of said induced flow duct is formed in the shape of a slot which is transversely disposed across at least a portion of said intake channel.

4. A circulator/aerator in accordance with claim 3 wherein said slot has a height which is substantially equal to ten percent to fifty percent of the average depth of liquid in said intake channel.

5. A circulator/aerator in accordance with claim 3 wherein said combined flow portion of said discharge duct is substantially rectangular in cross-section and has a width which is substantially equal to or greater than the width of the pumped flow portion of said discharge duct.

6. A circulator/aerator in accordance with claim 5 wherein said rectangularly shaped combined flow portion has a height which is substantially equal to twenty percent to one hundred percent of the average depth of liquid in said intake channel.

7. A circulator/aerator in accordance with claims 2 or 5 wherein said combined flow portion of said discharge duct is disposed at a vertical depth greater than the depth of the bottom of said endless channel.

8. A circulator/aerator in accordance with claim 7 wherein said terminal segment of said combined flow duct extends upwardly to the bottom of said discharge channel portion.

9. A circulator/aerator in accordance with claim 8 wherein said combined flow portion of said discharge duct has a length which is substantially equal to at least twenty-five feet between the inlet end thereof and the terminal segment.

10. A circulator/aerator in accordance with claim 9 additionally comprising an eddy jet header disposed proximate the inlet end of said induced flow duct.

11. A circulator/aerator in accordance with claim 5 additionally comprising a clarifier disposed within said discharge channel portion above said combined flow portion of said discharge duct, said clarifier having an upstream wall which forms at least a portion of said barrier.

12. A circulator/aerator in accordance with claim 11 wherein at least a portion of the bottom of said clarifier forms at least a portion of the top of said combined flow portion of said discharge duct.

13. A circulator/aerator in accordance with claim 12 wherein said portion of the bottom of said clarifier is at least as deep as the bottom of said endless channel.

14. A circulator/aerator in accordance with claim 13 which additionally comprises an eddy jet header disposed proximate the inlet end of said induced flow duct.

15. A circulator/aerator in accordance with claim 12 wherein at least a portion of the lower part of said upstream wall is inclined in a downstream direction to form at least a portion of the top of said induced flow duct.

16. A circulator/aerator in accordance with claim 1 wherein the inlet of said induced flow duct is disposed downstream of said draft tube.

17. A circulator/aerator in accordance with claim 16 wherein the inlet of aid induced flow duct is formed in the shape of a slot which is transversely disposed across at least a portion of said intake channel.

18. A circulator/aerator in accordance with claim 17 wherein said slot has a height which is substantially equal to ten percent to fifty percent of the average depth of liquid in said intake channel.

19. A circulator/aerator in accordance with claim 17 wherein said combined flow portion of said discharge duct is substantially rectangular in cross-section and has a width which is substantially equal to or greater than the width of the pumped flow portion of said discharge duct.

20. A circulator/aerator in accordance with claim 19 wherein said rectangularly shaped combined flow portion has a height which is substantially equal to twenty percent to one hundred percent of the average depth of liquid in said intake channel.

21. A circulator/aerator in accordance with claim 19 wherein said combined flow portion of said discharge duct is disposed at a vertical depth greater than the depth of the bottom of said endless channel.

22. A circulator/aerator in accordance with claim 21 wherein said terminal segment of said combined flow duct extends upwardly to the bottom of said discharge channel portion.

23. A circulator/aerator in accordance with claim 22 wherein said combined flow portion of said discharge duct has a length which is substantially equal to at least twenty-five feet between the inlet end thereof and the terminal segment.

24. A circulator/aerator in accordance with claim 23 additionally comprising an eddy jet header disposed proximate the inlet end of said induced flow duct.

25. A circulator/aerator in accordance with claims 16 or 19 additionally comprising a clarifier disposed within said discharge channel portion above said combined flow portion of said discharge duct, said clarifier having an upstream wall which forms at least a portion of said barrier.

26. A circulator/aerator in accordance with claim 25 wherein at least a portion of the bottom of said clarifier forms at least a portion of the top of said combined flow portion of said discharge duct.

27. A circulator/aerator in accordance with claim 26 wherein said portion of the bottom of said clarifier is at least as deep as the bottom of said endless channel.

28. A circulator/aerator in accordance with claim 26 wherein at least a portion of the lower part of said upstream wall is inclined in a downstream direction to form at least a portion of the top of said induced flow duct in the shape of a slot.

29. A circulator/aerator in accordance with claim 28 additionally comprising an eddy jet header disposed proximate the inlet end of said induced flow duct.

* * * * *